(12) United States Patent
Liebenow et al.

(10) Patent No.: US 10,147,929 B2
(45) Date of Patent: Dec. 4, 2018

(54) DEVICE FOR INCREASING SAFETY WHEN USING BATTERY SYSTEMS

(71) Applicant: Lithium Energy and Power GmbH & Co. KG, Stuttgart (DE)

(72) Inventors: Cornelius Liebenow, Stuttgart (DE); Stephan Leuthner, Leonberg (DE)

(73) Assignee: Lithium Energy and Power GmbH & Co. KG, Stuttgart (DE)

( * ) Notice: Subject to any disclaimer, the term of this patent is extended or adjusted under 35 U.S.C. 154(b) by 42 days.

(21) Appl. No.: 15/287,902

(22) Filed: Oct. 7, 2016

(65) Prior Publication Data

US 2017/0104203 A1  Apr. 13, 2017

(30) Foreign Application Priority Data

Oct. 9, 2015  (EP) .................................. 15189123

(51) Int. Cl.
| | |
|---|---|
| *H01M 10/052* | (2010.01) |
| *H01M 2/34* | (2006.01) |
| *H01M 10/0525* | (2010.01) |
| *H01M 10/48* | (2006.01) |
| *H01M 2/02* | (2006.01) |
| *H01M 10/42* | (2006.01) |
| *B60L 3/00* | (2006.01) |
| *B60L 11/18* | (2006.01) |

(52) U.S. Cl.
CPC .......... *H01M 2/347* (2013.01); *B60L 3/0015* (2013.01); *B60L 3/0046* (2013.01); *B60L 11/1879* (2013.01); *H01M 2/0292* (2013.01); *H01M 10/0525* (2013.01); *H01M 10/425* (2013.01); *H01M 10/48* (2013.01); *H01M 10/482* (2013.01); *H01M 2/0287* (2013.01); *H01M 2/345* (2013.01); *H01M 2200/00* (2013.01); *H01M 2220/20* (2013.01); *Y02E 60/122* (2013.01)

(58) Field of Classification Search
CPC ... H01M 2/347; H01M 2/0292; H01M 10/052
See application file for complete search history.

(56) References Cited

U.S. PATENT DOCUMENTS

| | | | | |
|---|---|---|---|---|
| 4,816,737 | A * | 3/1989 | Delmas ............... | H01M 10/486 320/150 |
| 2007/0122691 | A1 | 5/2007 | Lee et al. | |
| 2010/0068607 | A1 | 3/2010 | Spare et al. | |
| 2012/0105370 | A1 | 5/2012 | Moore | |
| 2013/0196213 | A1 | 8/2013 | Schaefer et al. | |
| 2013/0216877 | A1 | 8/2013 | Campbell | |
| 2015/0017498 | A1* | 1/2015 | Henrici ............... | H01M 10/425 429/90 |

FOREIGN PATENT DOCUMENTS

| | | |
|---|---|---|
| DE | 102008053011 | 4/2010 |
| DE | 102011112641 | 3/2013 |
| JP | 2008258110 | 10/2008 |

* cited by examiner

*Primary Examiner* — Olatunji A Godo
(74) *Attorney, Agent, or Firm* — Michael Best & Friedrich LLP

(57) ABSTRACT

A battery cell (BZ), in particular a lithium-ion battery cell, wherein the battery cell (BZ) has a number of contact sensor elements (S) for detecting elements (N) which bear on the contact sensor elements (S) or apply pressure to the contact sensor elements (S), wherein the contact sensor elements (S) are electrically insulated from one another.

20 Claims, 1 Drawing Sheet

DEVICE FOR INCREASING SAFETY WHEN USING BATTERY SYSTEMS

BACKGROUND OF THE INVENTION

The present invention relates to a device and to a battery cell, in particular a lithium-ion battery cell, and to the use of a battery cell.

In the event of a defect or of incorrect handling of a battery cell, the battery cell can experience gas formation in the interior of the battery cell. The gas formation results in an overpressure. It is known to provide an overpressure valve or a bursting diaphragm in a housing of the battery cell in order to discharge the gases which have been produced and to avoid thermal runaway of the battery cell.

For example, DE 10 2008 053 011 A1 discloses a galvanic battery cell for an accumulator, in which galvanic battery cell a sensor device is provided with which an undesired state of the galvanic battery cell can be detected. Suitable sensor devices are, for example, temperature measuring devices, piezo-elements, strain measuring gauges or other measuring devices. These other measuring devices serve, in particular to detect deformations of the housing if, for example, formation of gas and an associated increase in pressure occur inside the battery cell.

In addition, DE 10 2011 112 641 A1 discloses a method for testing a lithium-ion battery cell with respect to its functional capability, in which method impacts are applied to certain locations on a housing of the battery cell, as a result of which sound is produced. This sound is received with a microphone which is arranged outside the battery cell. The state of the battery cell is inferred from the received signal of the microphone.

In addition, US 2007/122691 A1 discloses a battery cell which is arranged with a piezo-electric element in a common frame. The piezo-electric element is suitable for detecting swelling of the battery cell owing to abnormal operations of the battery cell.

SUMMARY OF THE INVENTION

The invention is based on a battery cell, in particular a lithium-ion battery cell, wherein the battery cell has a number of contact sensor elements for detecting elements which bear on the contact sensor elements or apply pressure to the contact sensor elements.

The core of the invention is that the contact sensor elements are electrically insulated from one another.

The inventive fact that the contact sensor elements are electrically insulated from one another means that a precise location at which an element bears on a contact sensor element or applies pressure to a contact sensor element can be determined. These elements which bear on the contact sensor elements or apply pressure to the contact sensor elements can be, for example, a metallic object, in particular a nail. The metallic object is capable here of penetrating the interior of the battery cell through the housing of the battery cell. The electrically conductive object can cause a safety-critical state of the battery cell through its penetration into the battery cell. Such a safety-critical state can consist, for example, in the fact that an electrical short circuit occurs within the battery cell or that substances can pass in an uncontrolled fashion from the battery cell into the surroundings of the battery cell, or that substances can pass into the interior of the battery cell.

As a result of the fact that the location at which the element which applies pressure causes mechanical deformation of the battery cell and, in particular mechanical deformation of a housing of the battery cell is known, measures can be selectively initiated.

The selectively initiated measures are intended to transfer the battery cell into a safe state. Such a safe state of the battery cell is present if a risk for persons or objects which are located in the surroundings of the battery cell is reduced. In order to transfer the battery cell into a safe state, for example discharging of the battery cell or electrical bypassing of the battery cell can be performed. In addition, electrical bypassing of individual components of the battery cell can be performed. The individual components of the battery cell are, for example, individual electrode windings of the battery cell. In addition, a repair measure can be carried out, for example, at the location at which the housing of the battery cell and, if appropriate, the interior of the battery cell has been deformed mechanically and damaged by the element which applies pressure.

By virtue of the fact that the location at which the mechanical deformation of the battery cell takes place is known, the safety-relevant measure can be initiated and completed efficient The background of the invention is to increase safety when dealing with battery cells and to avoid the occurrence of a safety-critical state of the battery cell, as well as to reduce the effects of a safety-critical state.

A safety-critical state of the battery cell occurs, for example, when the battery cell has been damaged. For example, the penetration of an electrically conductive object into the battery cell can bring about an electrical short circuit inside the battery cell. Furthermore, substances may undesirably escape from the battery cell. The safety-critical state involves an increase in the probability of injury to persons or damage to objects which are located in the surroundings of the battery cell.

The invention also relates to the use of a battery cell in a battery system or in a vehicle, in particular in a motor vehicle.

According to a preferred refinement of the invention, an insulating layer is arranged between a housing of the battery cell and the contact sensor elements.

As a result of the inventive fact that an insulating layer is arranged between a housing of the battery cell and the contact sensor elements, contact sensor elements which can be electrically conductively connected to the housing can be used. At the same time, if the element which applies pressure is an electrically conductive object, an electrically conductive connection is formed between the contact sensor elements and the housing when the element which applies pressure penetrates the insulating layer and connects the contact sensor element physically to the housing.

According to a subsequent preferred refinement of the invention, the insulating layer is constructed from polyimides and/or polyethylene terephthalate. As a result of the inventive fact that the insulating layer is constructed from polyimides and/or polyethylene terephthalate, an insulating layer is made available which is particularly robust with respect to mechanical loading, is resistant to an electrolyte and does not have any solvent emissions.

According to a further preferred refinement of the invention, the insulating layer has a thickness of 30 µm to 120 µm, in particular 20 µm to 120 µm, preferably 10 µm to 120 µm.

According to a further preferred refinement of the invention, the contact sensor elements are arranged at a distance of 2 mm to 3 mm from one another.

As a result of the inventive fact that the contact sensor elements are arranged at a distance of 2 mm to 3 mm from one another, the location at which the element applies pressure to the battery cell can be determined precisely.

According to a further preferred refinement of the invention, the contact sensor elements are constructed from nickel or copper or aluminum.

As a result of the inventive fact that the contact sensor elements are constructed from nickel or copper, particularly sensitive materials are made available which have high electrical conductivity. As a result of the fact that the materials have high electrical conductivity, even small electric currents which flow through an electrically conductive connection between the contact sensor elements and the housing can be detected. Examples of small electrical currents which can be detected are electrical currents of 1 mA to 10 mA.

According to a further preferred refinement of the invention, the contact sensor elements are arranged as films on the insulating layer.

As a result of the inventive fact that the contact sensor elements are arranged as films on the insulating layer, the contact sensor elements can be used in a space-saving fashion at various points on the battery cell. An arrangement of the contact sensor elements in the form of films is robust with respect to mechanical effects as a result of the mechanical flexibility of the film. The mechanical effects may be, for example, impacts. Furthermore, films can be arranged at low cost on the insulating layer and can easily be replaced when necessary.

According to a further preferred refinement of the invention, the contact sensor elements are arranged inside or outside the housing.

As a result of the inventive fact that the contact sensor elements are arranged outside the housing, an element which applies pressure can already be detected at a time at which the element which applies pressure has electrically conductively connected the contact sensor element to the housing as a result of penetration of the insulating layer, but the housing itself has not yet penetrated. As a result, measures for transferring the battery cell into a safe state can already be initiated at a time before mechanical deformation of the housing and associated damage to the battery cell has occurred. The safety-relevant measures may be, for example, complete discharge of the battery cell or the positioning of a current bypass.

As a result of the inventive fact that the contact sensor elements are arranged inside the housing, the contact sensor elements and the insulating layer are protected by the housing itself against mechanical influences and soiling. The usability of the contact sensor elements and of the insulating layer are therefore increased further.

According to a further preferred refinement of the invention, the contact sensor elements are connected to evaluation electronics and/or to a safety unit for initiating safety-relevant actions. The signals which are generated by the contact sensor element can be evaluated and processed further by means the evaluation electronics. In particular the safety unit can be actuated via the evaluation electronics. Alternatively the safety unit can directly evaluate the signals generated by the contact sensor element and process them further. The safety unit can for example bring about the positioning of a current bypass or the complete discharging of the battery cell.

BRIEF DESCRIPTION OF THE DRAWINGS

The invention will be explained below by means of exemplary embodiments from which further inventive features may arise, to which the invention is, however, not restricted in its scope. The exemplary embodiments are illustrated in the figures.

In the drawings.

DETAILED DESCRIPTION

Figure 1:
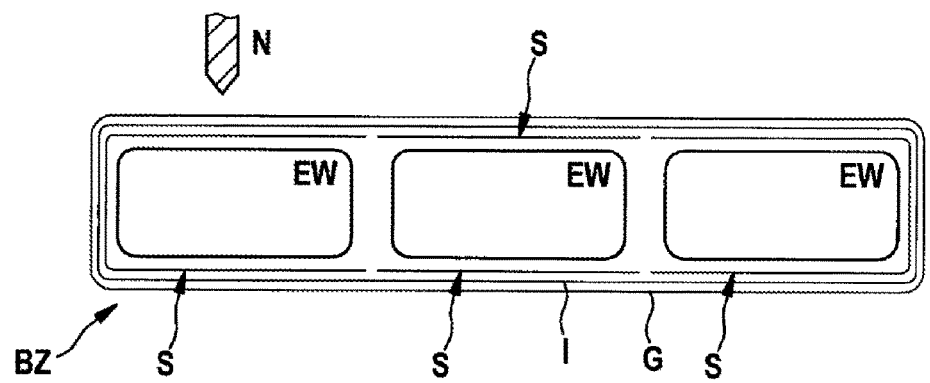
FIG. 1 shows a schematic illustration of the battery cell according to the invention according to a first embodiment.

An inventive battery cell according to a first embodiment is illustrated schematically in FIG. 1. The battery cell is denoted by BZ. The battery cell BZ can be, in particular, a lithium-ion battery cell. Battery sensor elements are denoted by S, wherein the contact sensor elements S are suitable for detecting elements which bear on the contact sensor elements S or apply pressure to the contact sensor elements S.

An electrically insulating layer is arranged between the contact sensor elements S and the housing G. The electrically insulating layer is denoted by I.

The contact sensor elements S can be, in particular, an electrically conductive object which can be electrically connected to an electrically conductive housing, denoted by G, via an electrically conductive penetrating object. The electrically conductive penetrating object is denoted N. The electrically conductive object N which penetrates the housing G can be, in particular, a nail or some other metallic object which is capable of penetrating the housing G and the insulating layer I and of penetrating the battery cell BZ.

In the interior of the battery cell BZ, individual electrode windings are arranged. The individual electrode windings are denoted by EW.

Since the individual contact sensor elements S are not electrically connected to one another but instead to an electronic evaluation unit via an individual connection, when the electrically conductive object N penetrates the battery cell BZ a specific contact sensor element S can be detected electrically.

The background is that an electrical connection between the housing G and the specific contact sensor element S is formed precisely at the location at which the electrically conductive object N penetrates the housing G. By means of the specific contact sensor element S it is therefore possible to determine where the electrically conductive object N has penetrated through the housing G and the insulating layer I as far as the contact sensor element S. By means of evaluation electronics and/or with a safety unit for initiating safety-relevant actions it is possible to initiate selectively safety-relevant measures at the location of the housing G at which the housing G has been damaged. At this location, repair measures can therefore be initiated, for example soon after the damage of the housing G. In addition, it can be determined directly which electrode winding EW has possibly been damaged by the electrically conductive object N.

Figure 2:
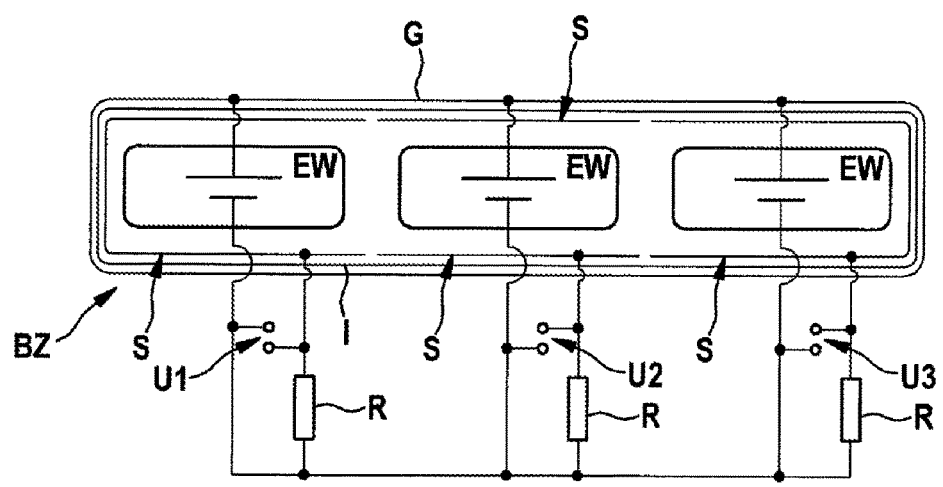
FIG. 2 shows a schematic illustration of a battery cell according to the invention according to a second embodiment.

FIG. 2 is a schematic illustration of a battery cell BZ according to the invention in accordance with a second embodiment. The housing of the battery cell BZ is denoted G. An electrically insulating layer of the battery cell BZ is denoted I. Contact sensor elements are denoted by S, wherein the contact sensor elements S are suitable for detecting elements which bear on the contact sensor elements S or apply pressure to the contact sensor elements S. In particular, the contact sensor elements S are suitable for producing an electrically conductive connection to the housing G via an electrically conductive object. The further electrically conductive object may be, for example, a nail or some other metallic object.

FIG. 2 also illustrates a possible electrical circuit for determining the location at which an electrically conductive object has brought about an electrically conductive connection between a contact sensor element S and the housing G.

Ohmic resistances are denoted R. According to this embodiment the housing G is connected to a positive pole of an electrode winding EW.

The electrical connection between the contact sensor elements S and the housing G is configured with high impedance, with the result that the usual electrical voltage of the battery cell BZ is applied to the voltage taps U1, U2 and U3. If an electrically conductive object electrically conductively connects a contact sensor element S to the housing G, a low-impedance contact is produced between the contact sensor element S and the housing G. As a result, a significantly lower voltage is present at the corresponding voltage tap U1, U2 or U3 than at the two other voltage taps. As a result of the fact that a relatively low voltage is present at this voltage tap, it is possible to determine by means of an electronic circuit at which point in the housing G penetration has taken place and which electrode winding EW has possibly been affected and damaged by this penetration.

What is claimed is:

1. A battery cell (BZ) comprising a plurality of individual electrode windings and a number of contact sensor elements (S) for detecting elements (N) which bear on the contact sensor elements (S) or apply pressure to the contact sensor elements (S), wherein the contact sensor elements (S) are electrically insulated from one another, wherein the individual contact sensor elements each have an individual connection to an electronic evaluation unit, and further wherein each contact sensor element of the number of contact sensor elements corresponds to one individual electrode winding of the plurality of individual electrode windings.

2. The battery cell (BZ) according to claim 1, characterized in that an insulating layer (I) is arranged between a housing (G) of the battery cell (BZ) and the contact sensor elements (S).

3. The battery cell (BZ) according to claim 2, characterized in that the insulating layer (I) is constructed from polyimides and/or polyethylene terephthalate.

4. The battery cell (BZ) according to claim 2, characterized in that the insulating layer (I) has a thickness of 30 μm to 120 μm.

5. The battery cell (BZ) according to claim 1, characterized in that the contact sensor elements (S) are arranged at a distance of 2 mm to 3 mm from one another.

6. The battery cell (BZ) according to claim 1, characterized in that the contact sensor elements (S) are constructed from nickel or copper or aluminum.

7. The battery cell (BZ) according to claim 2, characterized in that the contact sensor elements (S) are arranged as films on the insulating layer (I).

8. The battery cell (BZ) according to claim 1, characterized in that the contact sensor elements (S) are arranged inside or outside the housing (G).

9. The battery cell (BZ) according to claim 1, characterized in that the contact sensor elements (S) are connected to evaluation electronics.

10. The battery cell (BZ) according to claim 1, characterized in that the contact sensor elements (S) are connected to a safety unit for initiating the safety-relevant actions.

11. The battery cell (BZ) according to claim 1, characterized in that the contact sensor elements (S) are connected to evaluation electronics and to a safety unit for initiating the safety-relevant actions.

12. The battery cell (BZ) according to claim 2, characterized in that the insulating layer (I) has a thickness of 20 μm to 120 μm.

13. The battery cell (BZ) according to claim 2, characterized in that the insulating layer (I) has a thickness of 10 μm to 120 μm.

14. The battery cell (BZ) according to claim 3, characterized in that the insulating layer (I) has a thickness of 30 μm to 120 μm.

15. The battery cell (BZ) according to claim 14, characterized in that the contact sensor elements (S) are arranged at a distance of 2 mm to 3 mm from one another.

16. The battery cell (BZ) according to claim 15, characterized in that the contact sensor elements (S) are constructed from nickel or copper or aluminum.

17. The battery cell (BZ) according to claim 16, characterized in that the contact sensor elements (S) are arranged as films on the insulating layer (I).

18. The battery cell (BZ) according to claim 17, characterized in that the contact sensor elements (S) are arranged inside or outside the housing (G).

19. The battery cell (BZ) according to claim 18, characterized in that the contact sensor elements (S) are connected to evaluation electronics and/or to a safety unit for initiating the safety-relevant actions.

20. A motor vehicle comprising a battery cell according to claim 1.

* * * * *